W. K. MENNS.
CAMERA.
APPLICATION FILED JUNE 4, 1917.

1,272,292.

Patented July 9, 1918.
2 SHEETS—SHEET 1.

Inventor:
Walter K. Menns,
by Clyde L. Rogers
his Atty

W. K. MENNS.
CAMERA.
APPLICATION FILED JUNE 4, 1917.

1,272,292.

Patented July 9, 1918.
2 SHEETS—SHEET 2.

Inventor:
Walter K. Menns
by Clyde L. Rogers
his Atty.

UNITED STATES PATENT OFFICE.

WALTER K. MENNS, OF CHELSEA, MASSACHUSETTS.

CAMERA.

1,272,292.  Specification of Letters Patent.  Patented July 9, 1918.

Application filed June 4, 1917. Serial No. 172,742.

*To all whom it may concern:*

Be it known that I, WALTER K. MENNS, a citizen of the United States, and resident of Chelsea, county of Suffolk, Commonwealth of Massachusetts, have invented an Improvement in Cameras, of which the following description, in connection with the accompanying drawings, is a specification, like characters on the drawings representing like parts in each of the several views.

This invention relates to cameras and more especially to a type of a magazine plate camera wherein the plates before exposure are kept in one magazine, and after exposure, each successive plate tilted through a quarter turn and deposited in another magazine container. The invention has to do more particularly with a camera of this type wherein a swinging mirror is employed which may be positioned diagonally across the path of light through the lens so that focusing may be done through the lens. A prime object of the invention is to provide a camera of this type with means whereby the lens shutter is controlled automatically and synchronously with reference to the movements of the plate and of the swinging mirror, so that the shutter will be opened to permit focusing only while the focusing mirror is let down to diagonal position closing the passage of light back to the plate, the shutter being always closed when the focusing mirror is swung upward, and the mechanism also providing means whereby the lens shutter is reset for instantaneous exposures. The foregoing and other objects and advantages of the invention will more fully appear from the following detailed description, and the distinctive features of novelty will be pointed out in the appended claims.

Referring to the drawings.

Figures 1, 2:
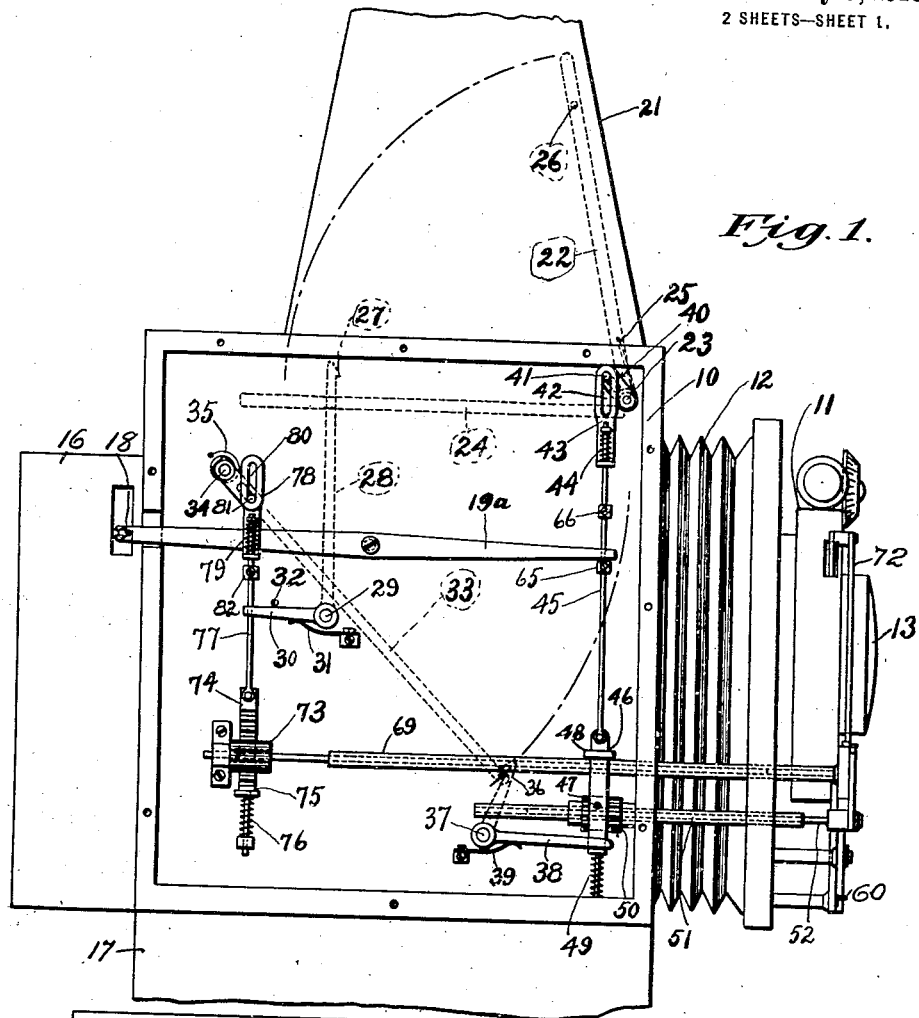
Figure 1 is a side elevation with an outer side removed and with a portion broken away, of a camera constructed in accordance with my invention.
Fig. 2 is a front view thereof.
Figure 3:
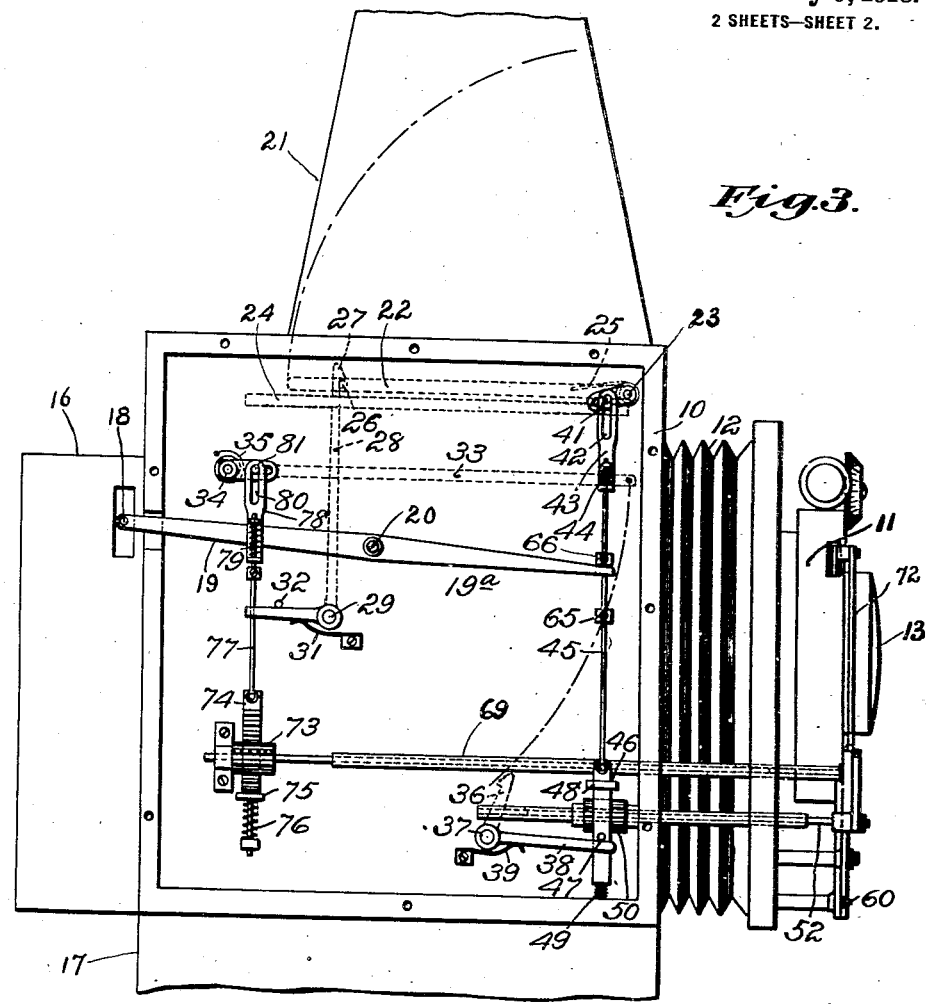
Fig. 3 is a view similar to Fig. 1 showing the parts in different relative positions.
Figure 4:
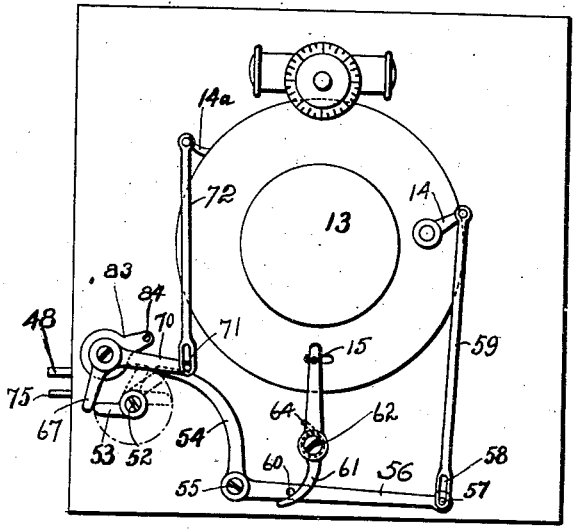
Fig. 4 is a front view similar to Fig. 2 but showing the parts in different relative positions.

A camera box of usual or suitable form is indicated at 10 with a lens holder 11 adjustable toward and from the same with a usual expanding hood 12. The lens 13 is equipped with a suitable shutter shown as of the well known "compound shutter" type, having at one side a lever 14 for setting or winding up the instantaneous exposure spring (not shown) and having at its other side a lever 14ª for tripping the instantaneous exposure or for opening the shutter for time, according to the position of a pin 15 operative in a slot at the lower portion of the shutter, this pin when in one position, *i. e.*, at the left as shown, setting the shutter for instantaneous exposure on actuation of the arm 14ª, while when said pin is moved to the right as shown, the actuation of the arm 14ª opens the shutter for time. A magazine for the plates before exposure is indicated at 16 at the back of the camera and another magazine 17 is located at the bottom of the camera box 10 in position to receive the plates as they each swing downward successively after exposure from the magazine 16. For releasing the successive plates to permit them to swing down after exposure a suitable escapement device 18 which may be of usual known type is carried at the end of a lever 19 fulcrumed to the box at 20 and having its other end engageable by operating devices presently to be explained. A usual focusing hood 21 is shown at the top of the camera box which has an opening from said hood normally closed by a safety shutter 22 hinged to the box at 23, there being a ground glass plate 24 mounted in the box just below this safety shutter when in lowered position. The safety shutter 22 is equipped with a spring 25 acting thereon adjacent its pivot tending to throw it upward to an open position as shown in Fig. 1 and for holding it closed, it is provided with a pin 26 engageable by a latch hook 27 at the end of an upright arm 28 by a bell crank lever pivoted to the box at 29 and having a horizontally extending arm 30 acted on by a spring 31 to normally hold said arm against a stop pin 32 in which position the latch hook 27 is adapted to engage over the pin 26 when the safety shutter is pulled down as presently explained. A focusing mirror 33 is pivoted to the frame box at 34 and is equipped with a spring 35 anchored near the pivot thereof and tending to swing said mirror up to a horizontal inoperative position as shown in Fig 3. For holding the mirror 33 downward in a diagonal operative position, a latch hook 36 engageable with a pin on the mirror is provided, this latch hook being pivoted to the box at 37 and having rigid therewith a horizontally extending arm 38 acted on by a spring 39 which tends to swing the hook 36 up so as to engage the pin on the mirror as the mirror is swung downward as presently explained, to hold the mirror in operative position during the period of focusing. In Fig. 1 it will be noted that the parts are in position for focusing, i. e., with the safety shutter 22 swung upward, and the mirror 33 held latched in its downward diagonal position. For shifting the parts so as to permit an exposure, the safety shutter 22 has rigid therewith a short arm 40 bearing a pin 41 engageable in a long slot 42 of a pull link 43 which through an interposed yielding spring connection 44 is connected with a pull rod 45 having fixed at its lower end a bar 46 suitably guided in the box, this bar having fixed thereon a pin 47 engageable with the arm 38 so as to trip the latch 36 and release the mirror. The bar 46 is provided with a hand piece 48 which projects through the side of the camera and when this is pressed downward against the pressure of a spring 49 reacting between the bottom of bar 46 and the box, the pin 41 first swings the safety shutter 22 down to horizontal operative position and the pin 47 next acting on the lever arm 38 trips the latch 36 so that the mirror 33 swings up to horizontal inoperative position clearing the path for light from the lens to the plate to be exposed. The bar 46 is provided on its inner face with rack teeth engageable with a pinion 50 fixed on a tube 51 journaled in the box and constituting one portion of a telescopic shaft whose outer portion 52 has fixed rigid therewith an arm 53 which projects at the front of the shutter. The arm 53 engages with a cam action, a curved arm 54 pivoted at 55 to the front of the shutter, this arm having rigid therewith a horizontally extending arm 56. The arm 56 is equipped at its outer end with a pin 57 operative in an elongated slot 58 at the lower end of a rod 59 pivoted at its upper end to the instantaneous exposure setting lever 14. The arm 56 also bears at an intermediate point a pin 60 engageable with a curved lower end 61 of a lever pivoted at 62 at the front of the shutter, the upper end 63 of said lever having connection with the time exposure element consisting in the pin 15, such connection being of a nature so that the pin 15 is moved both ways with the lever arm 63. The lever 61—63 is normally held so that the curved arm 61 is constantly pressed against the pin 60 by a spring 64 applied at the pivot 62 and reacting on said lever. Thus it will be seen that the downward movement of the hand piece 48 which as already described closes the safety shutter and trips the mirror 33, also acts in the first part of its movement through the arms 53, 54, pin 60 and arm 61 to move the time exposure pin 15 for closing the shutter. It will also be seen referring to Fig. 4, that a further movement of the same parts will draw down the arm 59, thus operating the arm 14 and setting the shutter for instantaneous exposure. Thereupon the arm 53 passes out of engagement with the arm 54 and the spring 64 operating on the curved arm 61 will return the parts to initial position. As soon as the finger piece 48 is released the spring 49 presses the bar 46 and rod 45 again upward to their initial position. This movement of the rod 45 first downward and then upward is also utilized to operate the escapement 18 for the plates from the magazine 16. For this purpose the rod 45 is equipped with spaced apart stops 65, 66. These stops are positioned so that near the end of the downward movement of the rod 45, the stop 66 will engage the outer end 19$^a$ of the lever 19 lifting the escapement pin 18 and permitting the foremost plate to move forward against a front stop (not shown), according to usual practice. Thereupon as the rod 45 moves upward the lower stop 65 shifts the escapement pin 18 downward permitting the foremost plate to swing downward into the magazine 17 of exposed plates. The escapement device thus operated by the pin 18 is not herein shown in detail, since it may be of known and usual construction. The arm 53 in the oscillation of the shaft 52 as described also engages a depending arm 67 of a bell crank lever loosely pivoted at 68 to the end of a second telescopic shaft 69 to be presently further described, the other arm 70 of said bell crank lever engaging with a lost motion through a pin and slot connection 71 the lower end of a rod 72 which has its upper end pivoted to the trip lever 14$^a$ controlling the instantaneous and time exposure movement of the shutter,—so that the arm 70 is swung down by the arm 53 and the trip lever 14$^a$ finally moved down also as seen in Fig. 4 to trip the instantaneous exposure. The telescopic shaft 69 which is journaled in suitable bearings at the side of the box has fixed at the rear portion thereof a pinion 73 engageable by a rack formed on the face of a bar 74 slidably mounted at the side of the box, this bar being equipped with an outwardly projecting finger piece 75 and having a depending pin on which is mounted a coil spring 76 that reacts to normally press said bar upward. The upper end of this bar has connected thereto a rod 77 to the upper end of which is fitted with a capability of limited yielding outward extension, a bar 78, such extension being permitted by a coil spring 79 reacting between stops at the end of the rod 77 and of the bar 78. The upper end of the bar 78 has an elongated slot 80 in which operates a pin 81 carried on the holder of the mirror 33 at a little distance from the pivot 34 thereof. The rod 77 also has fixed thereon a lug 82 adapted to engage the lever arm 30 after the rod 77 is drawn down to some little extent. The outer end of the telescopic shaft 69 has fixed thereon an arm 83 equipped with a pin 84 adapted to engage the lever arm 70.

In operation upon depressing the hand piece 48, the latch 36 is first tripped to release the mirror 33 permitting it to swing up to horizontal position and the safety shutter 22 is drawn down to be engaged by the latch 27, thus making the camera box ready for the exposure. By the same movement the turning of the shaft 51 through the rack 46 and gear 47 turns the arm 53 which swings the arm 56 downward causing the pin 60 acting on the curved arm 61 to press the arm 63 to the left moving the pin 15 to the left end of its slot, i. e., in readiness for the instantaneous exposure. The movement of the arm 56 acting through the lost motion connection 57, 58 also pulls the arm 14 down setting the instantaneous exposure spring. It is to be understood that this pulling down of the arm 14 to wind or set this instantaneous exposure spring in the present "compound shutter" type, acts to lock the pin 15 against moving back to the right until after the instantaneous exposure has been tripped. A further movement of the arm 53 causes it to pass the end of the arm 54 and engage the arm 67, so that its final movement through the arm 70 and link 72 pulls down and trips the instantaneous exposure arm 14ᵃ making the exposure and closing the shutter. To again reset the parts for focusing the finger piece 75 is pressed downward, thus first drawing down the mirror 33 so that the hook 36 again engages the pin thereon to lock the mirror in diagonal downward position. On this downward movement the lug 82 also engages the arm 30 tripping the latch 27 so that the safety shutter again swings back to the position shown in Fig. 1. The box is now ready for focusing, the diagonally disposed mirror 33 protecting the magazine of unexposed plates from exposure. Then a further downward movement of the finger piece 75 turns the arm 83 so that the pin 84 engages the arm 70 and finally through the interposed lost motion connection draws down the arm 14ᵃ which acts at this time to open the shutter under the time exposure control, the pin 15 at this time being shifted to the right under the action of spring 64. As the pin 15 is thus shifted to the right, the curved arm 61 acting on the pin 60 swings upward the lever arm 56 restoring said arm and the arm 54 to initial position. Upon release of the finger piece 75 it will be noted that the rack 74 with connected parts is moved upward by the spring 76, without affecting any of the parts just operated thereby.

By thus providing connections for controlling the operation of the lens shutter with reference to the setting of the focusing mirror and of the safety shutter it is made possible to employ with a magazine plate camera, a focusing device making use of the main lens of the camera and protecting the plates from danger of premature exposure. It is to be noted that the lever 14 with the link 59 that winds up or sets the instantaneous exposure spring is locked as shown in Fig. 2 against movement until the lever arms 61—63 are swung over to move the pin 15 to the left as shown in Fig. 2 shutting the lens, i. e., when the focusing is done. I consider of special importance and value means as set forth thus coöperative with a lens shutter as distinguished from a focal plane or curtain shutter, since it is not possible to employ this latter type with the requisite controlling mechanism without getting in the way of the necessary plate movements in a magazine plate type of camera. I am aware that the invention may be embodied in other specific forms without departing from the spirit or essential attributes thereof and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A camera, comprising a box equipped with a magazine for presenting successive plates for exposure, a lens equipped with a shutter, means for focusing through said lens including a movable mirror, and means having connection with the lens shutter and focusing means whereby the shutter is locked closed during the shifting of said movable mirror from operative to inoperative position.

2. A camera, comprising a box equipped with a magazine for presenting successive plates for exposure, a lens equipped with a shutter, means for focusing through said lens including a movable safety shutter, and means having connection with the lens shutter and focusing means whereby the lens shutter is locked closed during the shifting of said safety shutter from inoperative to operative position.

3. A camera, comprising a box equipped with a magazine for presenting successive plates for exposure, a lens equipped with a shutter, means for focusing through said lens, and means including a swinging mirror and a swinging safety shutter having connections with said lens shutter and focusing means whereby the lens shutter is locked closed while said mirror is swinging from operative position to an inoperative position and while said safety shutter is swinging from inoperative position to operative position.

4. A camera, comprising a box equipped with a magazine to hold a series of plates for exposure, a lens equipped with a shutter, means for focusing through said lens including a swinging mirror, operating mechanism for controlling said lens and said shutter having connections holding said shutter locked closed while said mirror is swinging from operative to inoperative position, and means associated with and controlled by said operating mechanism for governing the movement of plates from said magazine.

5. A camera, comprising a box equipped with means for holding a plate in position for exposure, a lens equipped with a shutter, means for focusing through said lens including a swinging mirror having provision for holding the same diagonally with respect to said lens for focusing, operating mechanism for said shutter having connections for also controlling said mirror and with provision for holding the lens shutter locked closed while the mirror is swinging from operative position to inoperative position, and a lever connected with said operating mechanism and adapted to control the shifting of plates in said box.

6. A camera, comprising a box equipped with means for holding plates for exposure, a lens equipped with a shutter, means for focusing through said lens including a swinging mirror, means including a trip catch for holding said mirror in a diagonal position with respect to said lens for focusing, means for closing said shutter having a connection to operate said trip catch after the shutter is closed to release said mirror after swinging to inoperative position, said shutter having an instantaneous exposure device, and means for operating said instantaneous exposure device having a connection to restore said mirror to its diagonal focusing position after operating said instantaneous exposure device.

7. A camera, comprising a box equipped with means for holding plates in position for exposure, a lens equipped with a shutter and mounted for movement to and from said box with an expanding hood, a focusing mirror mounted to swing from a focusing position diagonally with respect to said lens to an inoperative position and equipped with means for normally holding it in inoperative position, a trip catch for holding said mirror in its diagonal focusing position, means for closing said shutter having connection for operating said trip catch after the shutter is closed, a safety shutter also controlled by the last named means for movement to operative position, said shutter having an instantaneous exposure device, means for operating said instantaneous exposure device having a connection for restoring said mirror to its diagonal focusing position, and having also a connection for releasing said safety shutter for permitting its return to an inoperative position.

In testimony whereof, I have signed my name to this specification.

WALTER K. MENNS.